No. 754,325. PATENTED MAR. 8, 1904.
A. LOTZ.
WIRE SOLDER ROLLING MACHINE.
APPLICATION FILED SEPT. 8, 1903.
NO MODEL.
2 SHEETS—SHEET 1.

Witnesses:—
F. C. Fliedner

Inventor,
Augustus Lotz
By Geo. H. Strong.
Atty

No. 754,325. PATENTED MAR. 8, 1904.
A. LOTZ.
WIRE SOLDER ROLLING MACHINE.
APPLICATION FILED SEPT. 8, 1903.
NO MODEL. 2 SHEETS—SHEET 2.
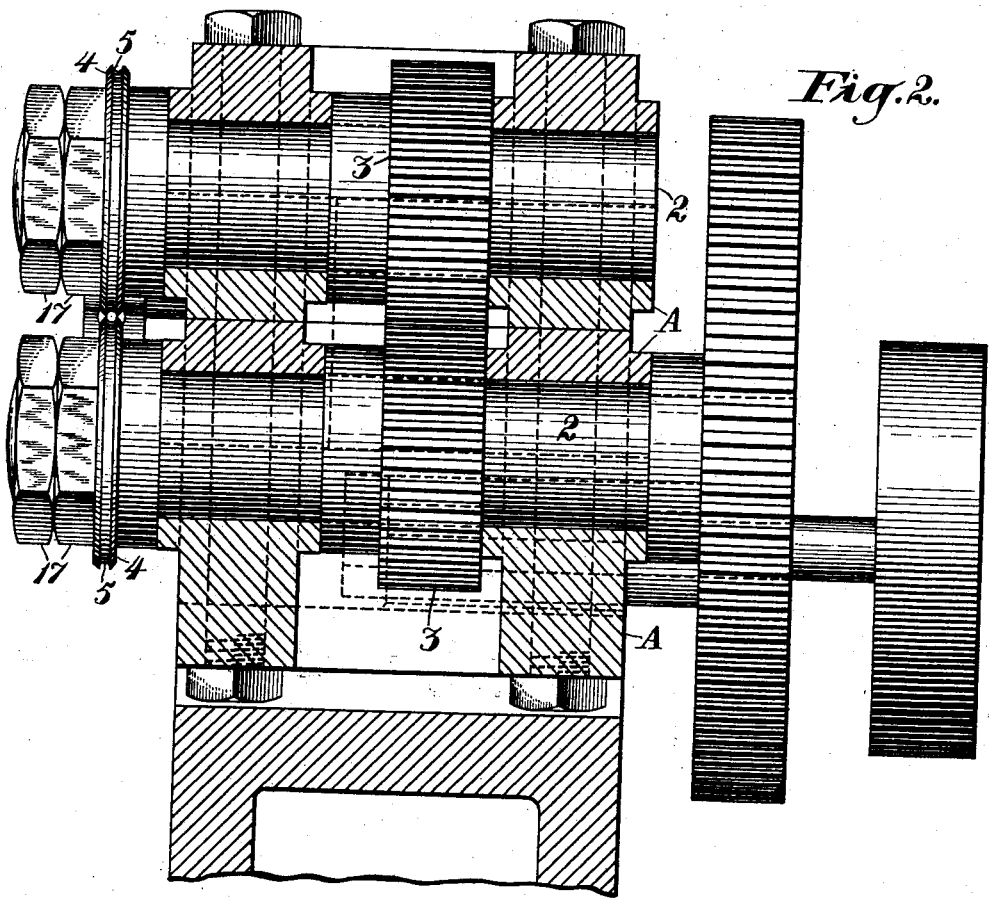
Witnesses:—
Inventor,
Augustus Lotz
By Geo. H. Strong
atty.

No. 754,325. Patented March 8, 1904.

UNITED STATES PATENT OFFICE.

AUGUSTUS LOTZ, OF SAN FRANCISCO, CALIFORNIA, ASSIGNOR TO PACIFIC METAL WORKS OF SAN FRANCISCO, CALIFORNIA, A CORPORATION OF CALIFORNIA.

WIRE-SOLDER-ROLLING MACHINE.

SPECIFICATION forming part of Letters Patent No. 754,325, dated March 8, 1904.

Application filed September 8, 1903. Serial No. 172,418. (No model.)

*To all whom it may concern:*

Be it known that I, AUGUSTUS LOTZ, a citizen of the United States, residing in the city and county of San Francisco and State of California, have invented new and useful Improvements in Wire-Solder-Rolling Machines, of which the following is a specification.

My invention relates to improvements in machines for rolling and trimming wire-solder.

The crude solder as it comes from the molds in a long continuous strip has a rough unfinished surface. It is necessary subsequently to run this strip through a sizing and trimming machine to give it a smooth uniform appearance.

The object of my invention is to provide a machine simple in construction and operation, capable of ready adjustment to roll solder in strips of any desired shape, and adapted to trim the strip uniformly and deliver the strip ready for coiling separate from the trimmings.

It consists of the parts and the construction and combination of parts hereinafter more fully described, having reference to the accompanying drawings, in which—

Figure 1:
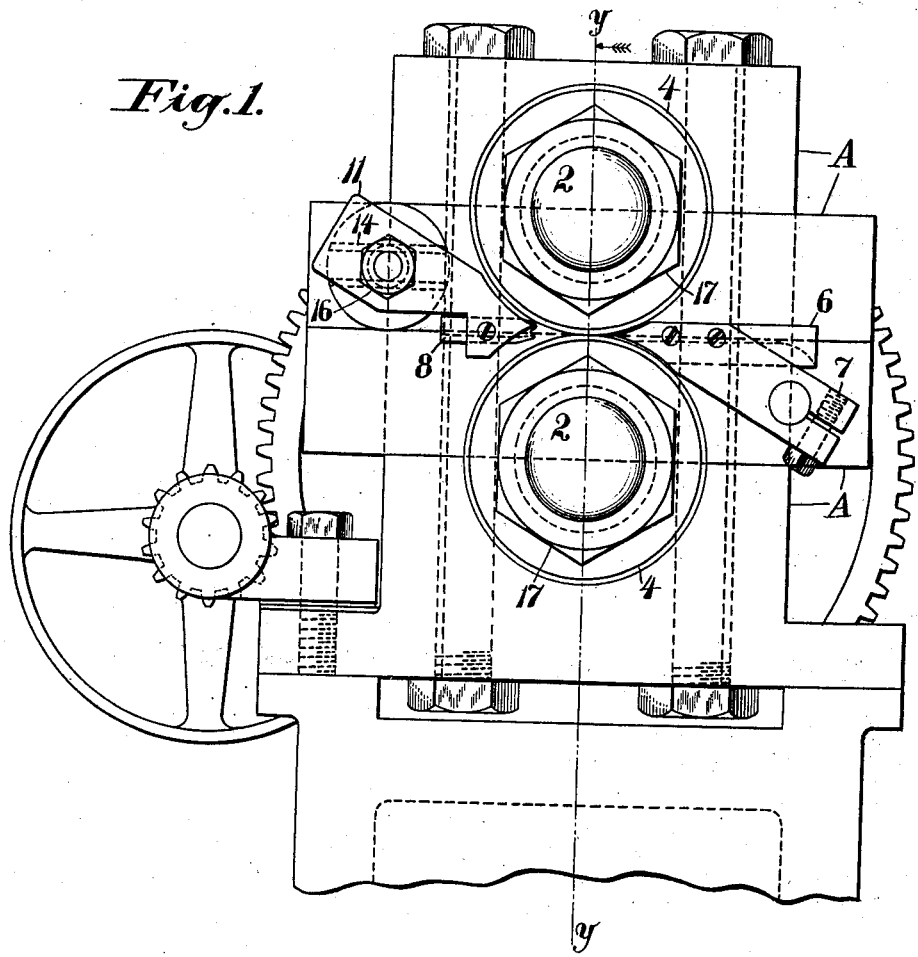
Figure 5:
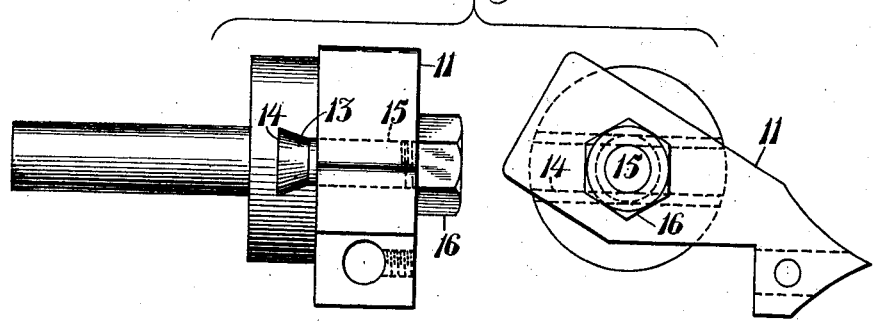

Figure 1 is a side elevation of my apparatus. Fig. 2 is a section taken on line *y y* of Fig. 1; Fig. 3, a detail of the guide; Fig. 4, a detail of the trimmer; Fig. 5, a detail of the holder for the trimmer.

The machine comprises a suitable support for the boxes A, in which are journaled the two heavy spindles 2 2, disposed parallel and in the same vertical plane and adapted, through the medium of the intermeshing gears 3, to be driven simultaneously and oppositely. Each spindle carries a hard-steel disk 4, having a peripheral groove 5 and beveled edges on each side of the groove and disposed approximately tangential to each other. The inclosed opening formed between the meeting edges of the grooves on the two disks corresponds in shape and size to that to be given to the solder strip. Usually the strip will be rolled round, and each groove will be segmental in cross-section; but if it is desired to roll a strip triangular or square in cross-section the grooves will be made to correspond.

6 represents a channeled guide adjustable, as shown at 7, and adapted to be set so that the wire may be directed into proper engagement with the disks 4, between which it is compressed and reduced to the desired diameter. Thence the wire passes to a suitable trimmer, as 8, disposed relative to the disks which separates the "fins" or thin surplus lateral edges of the wire formed by the pressing together of the two disk rollers as the strip passes between them. The disks are revolved to carry the wire forward from the guide, and the speed of the feed depends on the speed of the disks.

The trimmer 8 consists of a block having a longitudinal channel or groove 9, gradually enlarging toward the rear discharge end. The channel at the front end of the trimmer is of the same diameter as the finished wire, and the edges of the trimmer adjacent to the rolls are sharpened and beveled downward and outward, as shown at 10. The trimmer is adjustable in the holder 11 to bring the channel 9 into perfect alinement with the groove opening between the two disks. The opposite trimming edges of the trimmer are slightly concaved, as at 12. Both the trimmer and guide 6 are shaped on their adjacent ends so as to allow them to be inserted from opposite sides well in between the disks to reduce the space as much as possible that the solder strip will have to traverse unsupported between guide 6 and the disks and again between the latter and the trimmer.

The holder 11 is provided with a tongue 13, slidable in a groove 14 on the frame, and is adapted to be locked at any desired point along the groove by means of the bolt 15 and nut 16. Guide-groove 14 extends essentially parallel to the wire.

In practice guide 6 and trimmer 8 are carefully adjusted relative to the disks, so as to be in a perfectly straight line, the first to feed the solder to the disks, the second to receive the wire from the disks and strip it of the fin, allowing the finished wire to pass on to be wound upon spools or otherwise disposed of and the trimmings to be diverted downward and clear from the wire and forming apparatus.

The tongued and grooved feature of holder 11 and its support allows the holder and trimmer to be removed together for the purpose of sharpening the trimmer and permits their being replaced quickly without necessitating any disturbance of the delicate adjustment of the trimmer in the holder, for once the trimmer is adjusted to a pair of disks it is not desired to remove it from a holder until a new trimmer or one having a trimming-point of different shape is needed. The disks are locked on their spindles by means of the lock-nuts 17, which allow them to be quickly removed and others of a different groove shape substituted at any time. The disks may be provided with a feather engaging a groove on the spindle to prevent their turning.

Having thus described my invention, what I claim, and desire to secure by Letters Patent, is—

1. In a machine of the class described, the combination of two peripherally-grooved rollers approximately tangential to each other, a guide for the wire on the entrance side of the rollers, and a trimmer mounted at the delivery side of the rollers, said guide and trimmer having their adjacent ends shaped to enable them to be inserted from opposite sides well in between the disks.

2. In a machine of the class described, the combination of two suitably-mounted spindles, intermeshing gears thereon, each of said spindles carrying a removable disk having a peripheral groove, said disks substantially tangential and in the same vertical plane, a feed-guide on the entrance side of the disks, and a removable trimmer at the delivery side thereof, said trimmer having the receiving end shaped to enter the space between the disks.

3. In a wire-solder-rolling machine, the combination with form-rollers of cutter means coöperating with said rollers for receiving the wire therefrom, said cutter means longitudinally channeled to receive the wire and provided with cutting edges at the receiving end for removing any surplus metal from the wire.

4. In a wire-solder-rolling machine the combination with form-rollers of a trimmer and an adjustable removable holder for the trimmer, said trimmer longitudinally channeled to receive the wire and having its receiving end provided with cutting edges.

5. In a wire-solder-rolling machine, the combination with form-rollers, of a trimmer having a longitudinal guide-channel, the front end of said trimmer provided with beveled cutting edges and downwardly-extending guide portions coöperating with said cutting edges.

6. In a wire-solder-rolling machine, the combination with form-rollers of a trimmer having a longitudinal guide-groove gradually increasing in size toward its rear end, and opposed beveled concaved cutting edges coöperating with the front end of said groove.

7. In a wire-solder-rolling machine, the combination with form-rollers, of means for removing the surplus from the surface of the wire after its passing between said rollers, said means including a guide in line with the solder strip and in juxtaposition with the rollers and having a cutting member inclosing an opening which corresponds essentially to the cross-section of the finished strip and into which opening the wire is received, said cutting member beveled to divert the trimmings downward and outward from the finished wire.

8. In a wire-solder-rolling machine, the combination of a support, boxes thereon carrying spindles in the same vertical plane, intermeshing gears on said spindles, removable disks on said spindles, said disks having complementary forming-grooves in the same vertical plane, a feed-guide, and a trimmer adjustable in a line essentially tangential to the two disks, said guide and trimmer having their adjacent ends shaped to enter into the space between the disks.

In testimony whereof I have hereunto set my hand in presence of two subscribing witnesses.

AUGUSTUS LOTZ.

Witnesses:
S. H. NOURSE,
JESSIE C. BRODIE.